(12) United States Patent
Distefano et al.

(10) Patent No.: US 8,984,305 B2
(45) Date of Patent: Mar. 17, 2015

(54) METHOD AND APPARATUS TO CONFIGURE THERMAL DESIGN POWER IN A MICROPROCESSOR

(75) Inventors: Eric Distefano, Livermore, CA (US); Guy M. Therien, Beaverton, OR (US); Vasudevan Srinivasan, Hillsboro, OR (US); Tawfik Rahal-Arabi, Tigard, OR (US); Venkatesh Ramani, Milpitas, CA (US); Ryan D. Wells, Folsom, CA (US); Steven H. Gunther, Beaverton, OR (US); Jeremy Shrall, Portland, OR (US); James Hermerding, II, San Jose, CA (US)

(73) Assignee: Intel Corporation, Santa Clara, CA (US)

( * ) Notice: Subject to any disclaimer, the term of this patent is extended or adjusted under 35 U.S.C. 154(b) by 553 days.

(21) Appl. No.: 13/118,183

(22) Filed: May 27, 2011

(65) Prior Publication Data

US 2012/0159201 A1    Jun. 21, 2012

Related U.S. Application Data

(63) Continuation-in-part of application No. 12/974,100, filed on Dec. 21, 2010, now abandoned.

(51) Int. Cl.
*G06F 1/32* (2006.01)
*G06F 1/26* (2006.01)
*G06F 1/20* (2006.01)

(52) U.S. Cl.
CPC ...................... *G06F 1/206* (2013.01)
USPC .......................... 713/300; 713/324

(58) Field of Classification Search
USPC .......................... 713/300, 320, 324
See application file for complete search history.

(56) References Cited

U.S. PATENT DOCUMENTS

| | | | |
|---|---|---|---|
| 5,996,084 A * | 11/1999 | Watts | 713/323 |
| 6,457,135 B1 * | 9/2002 | Cooper | 713/323 |
| 6,754,837 B1 * | 6/2004 | Helms | 713/322 |
| 6,774,661 B1 * | 8/2004 | Tustaniwskyj et al. | 324/750.09 |
| 7,549,177 B2 * | 6/2009 | Diefenbaugh et al. | 726/36 |
| 7,596,708 B1 * | 9/2009 | Halepete et al. | 713/322 |
| 2001/0021981 A1 * | 9/2001 | Konaka et al. | 713/300 |
| 2004/0003301 A1 * | 1/2004 | Nguyen | 713/300 |
| 2004/0030940 A1 * | 2/2004 | Espinoza-Ibarra et al. | 713/300 |
| 2007/0011477 A1 * | 1/2007 | George et al. | 713/300 |
| 2008/0001795 A1 | 1/2008 | Arabi et al. | |
| 2009/0177334 A1 * | 7/2009 | Artman et al. | 700/300 |
| 2010/0064162 A1 | 3/2010 | Rotem et al. | |
| 2010/0115293 A1 | 5/2010 | Rotem et al. | |
| 2010/0115304 A1 * | 5/2010 | Finkelstein et al. | 713/320 |

(Continued)

OTHER PUBLICATIONS

"LM90 ±3° C. Accurate, Remote Diode and Local Digital Temperature Sensor with Two-Wire Interface", Texas Instruments, Dallas, Texas, SNIS126A, May 2004, 31 pages.

(Continued)

*Primary Examiner* — Jaweed A Abbaszadeh
*Assistant Examiner* — Phil Nguyen
(74) *Attorney, Agent, or Firm* — Mnemoglyphics, LLC; Lawrence M. Mennemeier

(57) ABSTRACT

A technique to change a thermal design power (TDP) value. In one embodiment, one or more environmental or user-driven changes may cause a processor's TDP value to be changed. Furthermore, in some embodiments a change in TDP may alter a turbo mode target frequency.

21 Claims, 9 Drawing Sheets

(56) References Cited

U.S. PATENT DOCUMENTS

2011/0022833 A1* 1/2011 Nussbaum et al. ............ 713/100
2011/0314312 A1* 12/2011 Naffziger et al. ............. 713/323
2012/0066535 A1* 3/2012 Naffziger ...................... 713/340

OTHER PUBLICATIONS

International Search Report and Written Opinion Received for PCT Patent Application No. PCT/US2011/064042, Jun. 29, 2012, 8 pages.
International Preliminary Report on Patentability received for PCT Patent Application No. PCT/US2011/064042, mailed on Jul. 4, 2013, 6 pages.
"Enhanced Intel® SpeedStep® Technology for the Intel® Pentium® M Processor", Intel White Paper, Mar. 2004, http://download.intel.com/design/network/papers/30117401.pdf, 12 pages.
AMD, BIOS and Kernal Developer's Guide for AMD Athlon (RTM) 64 and AMD Opteron (RTM) Processors, Revision 3.30, Publication # 260094, Issue Date: Feb. 2006, pp. 1-11 and pp. 382-385.
UK Intellectual Property Office, Patents Directorate, "Patents Act 1977: Examination Report Under Section 18 (3)" for Application GB1309430.5, Mailed Mar. 3, 2014, South Wales, NP108QQ, 3 pages.
Intel 64 and IA-32 Architectures Software Developer's Manual, vol. 3A: System Programming Guide, Part 1, Order No. 253668-039US, May 2011. Cover page—1 page; Contents—31 pages; Chapter 14—40 pages; Total pp. 72.
Intel 64 and IA-32 Architectures Software Developer's Manual, vol. 3B: System Programming Guide, Part 2, Order No. 253669-039US, May 2011. Cover Page—1 page; Appendix B—244 pages; Total pp. 245.

* cited by examiner

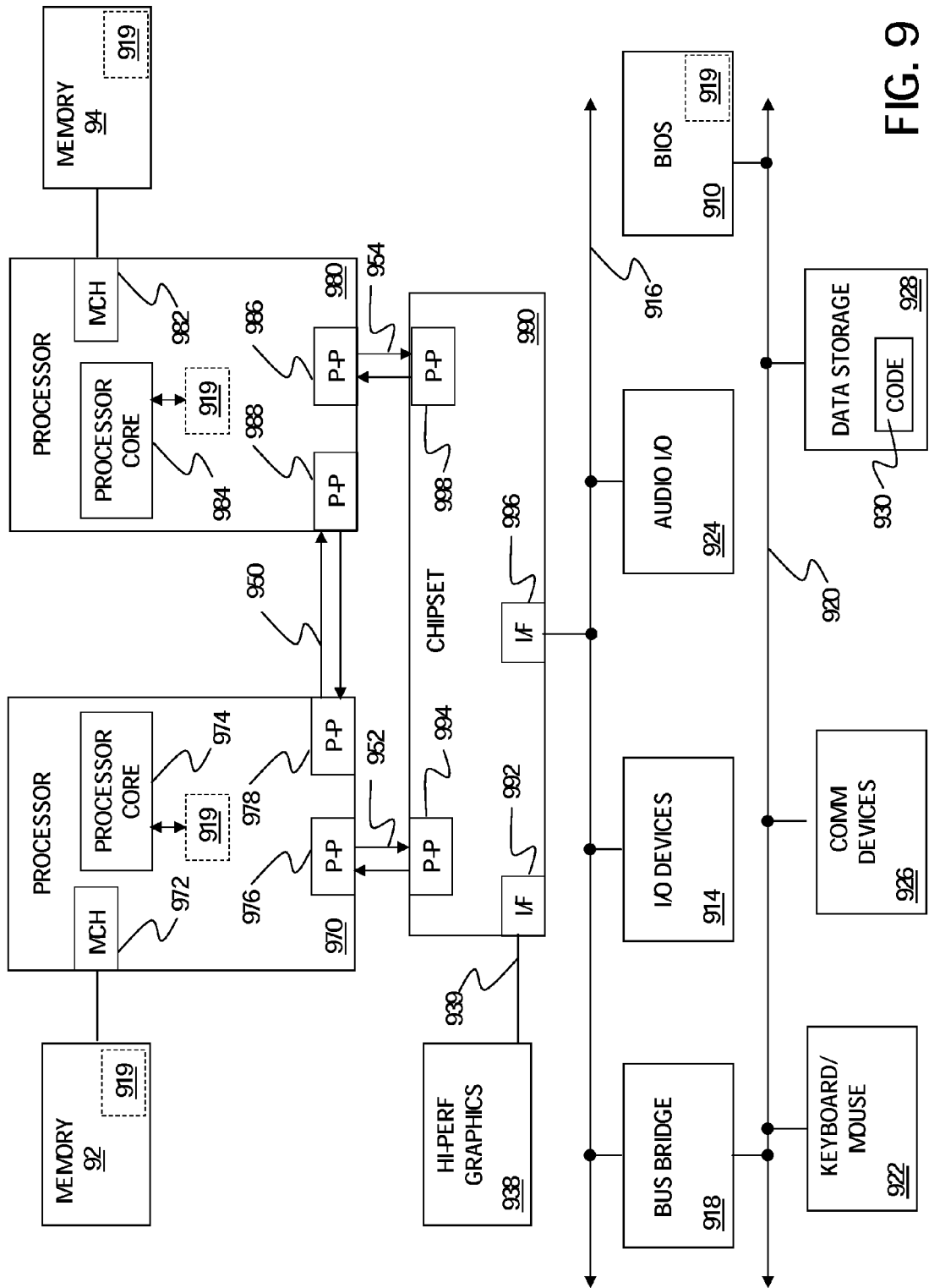

US 8,984,305 B2

METHOD AND APPARATUS TO CONFIGURE THERMAL DESIGN POWER IN A MICROPROCESSOR

RELATED APPLICATIONS

This is a continuation-in-part of application Ser. No. 12/974,100 filed Dec. 21, 2010, currently pending.

FIELD OF THE INVENTION

Embodiments of the invention relate generally to the field of information processing and more specifically, to the field of power management in computing systems and microprocessors.

BACKGROUND

Controlling power consumption in microprocessors is increasing in importance. Some prior art techniques for controlling processor power consumption have not adequately allowed flexible configuration of the thermal design power (TDP) specification for the processor.

BRIEF DESCRIPTION OF THE DRAWINGS

Embodiments of the invention are illustrated by way of example, and not by way of limitation, in the figures of the accompanying drawings and in which like reference numerals refer to similar elements and in which:

FIG. 9 illustrates a block diagram a point-to-point interconnect computer system, in which at least one embodiment of the invention may be used.

DETAILED DESCRIPTION

Figure 1:
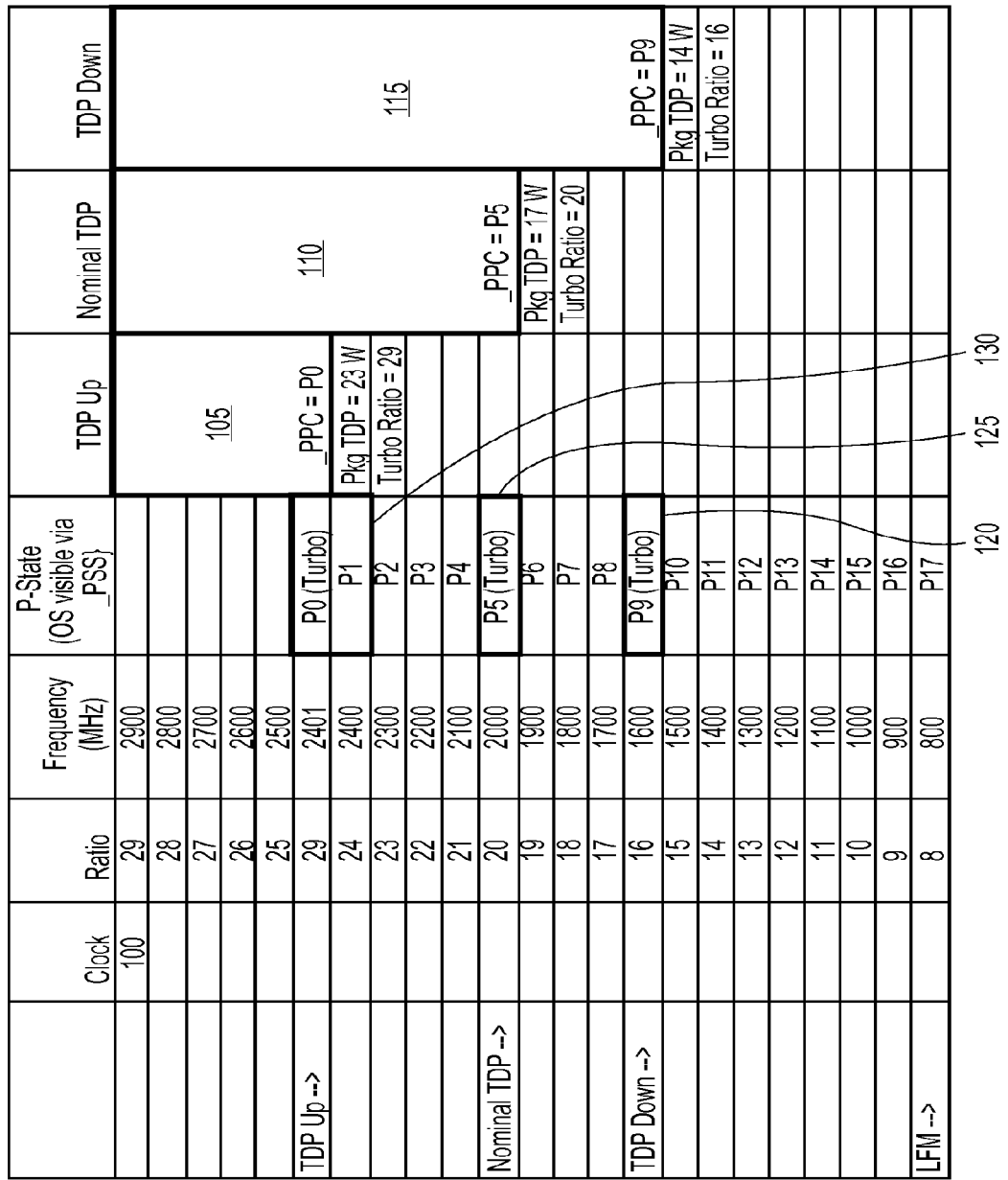
FIG. 1 illustrates a technique to configure thermal design power (TDP) according to one embodiment

Embodiments of the invention pertain to a configurable thermal design power (TDP) consumption for a processor. Although there are multiple embodiments of multiple aspects of the invention, at least one or more aspects are illustrated herein by way of example in order to teach embodiments of the invention and should not be construed to be an exhaustive or exclusive set of embodiments.

Processors may be rated or specified to include both performance and power related characteristics. Individual products or product families may have an associated specification including specific base and turbo frequency capabilities as well as other performance related characteristics. A range of power consumption in a processor may be specified for a product family. For example, standard voltage (SV) mobile processors might have a thermal design power (TDP) rating of 35 Watts. This rating may be an indication to original equipment manufacturers (OEMs) that processors purchased by an OEM will dissipate power that is less than or equal to the specified TDP value for the product when running a specified TDP workload, which may represent a worst case real-world workload scenario when operating at a worst case temperature. While specified performance characteristics may change across a product family, TDP may be specified as the same value across numerous product families. This allows an OEM to design a single platform that is capable of dissipating the specified TDP while offering a range of performance at different price points. Turbo capability, on the other hand, is a potential performance upside in that the TDP workload may cause the TDP power to be dissipated at the base frequency.

In some embodiments, there are several types of turbo mode. Above is a version of turbo mode pertaining to workload or package power sharing, in which case workloads that are otherwise lower natural power than TDP apps without turbo may benefit at the same frequency. These workloads may benefit by allowing power to rise back up to the package TDP power by giving it more than the base frequency. Another version of turbo mode is dynamic turbo mode, in which power is allowed to exceed TDP power for a limited duration, such that on average, over time, the power is still TDP power, which allows brief excursions exceeding TDP if preceded by powers lower than TDP, whether, for example, it be an idle workload or just a workload that does not draw a power equal to the TDP power threshold. TDP power also impacts power delivery design requirements.

Platform thermal capability is a design choice for OEMs as it impacts, size, weight, audible noise, and bill of materials (BOM) cost. The specified TDP for the processor therefore may have significant impact on the platform thermal design. Some processors are sold with only a few TDPs. For example, mobile processors' SV at 35 W, low voltage processors' SV at 25 W, and ultra-low-voltage processors' SV at 18 W.

In mobile platforms, it is possible that cooling capability and audible noise tolerance may vary depending on the use environment. For example, when docked and running on alternating current (AC) power a platform may have more cooling capability than when running undocked on battery power.

Running a higher power processor in an environment of lesser cooling capability than that which can cool the specified TDP may cause thermal control to reduce performance to what is really an unknown capability level that varies across products. Additionally, turbo capability may be disabled as part of thermal control.

A configurable TDP, according to one embodiment, may allow the OEM to configure the TDP of the processor to one of several values. This configuration can be performed either statically at initialization or dynamically, "on-the-fly". This is effectively accomplished by changing the base frequency of the processor to one of several supported base frequencies. The implication of this change may be that a certain performance is guaranteed by the base frequency and the TDP is specified for each of the supported base frequencies. Additionally, when the base frequency/TDP is changed, the point where turbo engages may also change accordingly. This provides the OEM with the capability to ensure that maximum power dissipation is known while still delivering turbo boost performance when the presented workload allows it.

FIG. 1 illustrates a technique to provide a configurable TDP in a processor, according to one embodiment, by providing three TDP levels, such as "TDP Up" 105, "Nominal TDP" 110, and "TDP Down" 115, which may correspond to power states, such as P-states P0 130, P5 125, and P9 120, respectively. As the TDP value changes dynamically, in one embodiment, the amount of turbo capability changes as well allowing more upside to turbo boost technology while still providing a specific performance to the end user.

In one embodiment, a configurable TDP technique includes validated and configured sets of frequencies and TDP values provided for a processor. In one embodiment, the validated values may be fused, programmed or otherwise configured into the hardware allowing the platform firmware or software to detect and utilize the capability.

In one embodiment, configurable TDP provides a mechanism for designing processors into new segments of platforms. For example, processors supporting configurable TDP may command a premium over other non-configurable TDP processors. OEMs may then choose to purchase a processor and configure it for their needs or provide it in a platform that supports on-the fly reconfiguration of performance and power. One such example is a "mobile extreme edition" platform un-docked and on battery. Configurable TDP has the potential to reduce the number of product families offered, as well.

In one embodiment, configurable TDP architecture makes no assumptions on standards or interdependencies with other technologies, etc. Table 1 below describes the various aspects and portions of a platform that may be affected by a configurable TDP, according to one embodiment.

TABLE 1

| Platform Component | Processor Impact |
|---|---|
| Core | Microcode for new MSRs |
| Uncore | Three configurable P1 ratios at respective TDP power levels change the current P1 ratio to one of the available three ratios |
| | Turbo states still available. Ability to turbo on any ratio request above current P1 ratio. (Different TDPs do not limit turbo ratios.) Ability to inform processor of new Turbo P-states. |
| | Expand allowable long time window power limit programming to include all TDP points |
| | Fuse corresponding to power set for TDP |
| | Fuse for ratios (set) for each of the three points |
| | 2X Fuses for down-binning OR a bit where make non-configurable when down-binned ("chicken bit") |
| Chipset | No Impact |
| Firmware/BIOS | Operating System power management interaction to limit OS P-state usage, detect Trigger (hot key), adjust RAPL limit, program turbo ratio. |
| OS | No Impact |
| Software | Software Stack implementation |
| Ecosystem | Segment to Segment Arbitrage |
| Boards/Chassis | Power delivery, System cooling, EC (enabling only) |
| Enabling | Power, Battery Life, Performance Characterization. |

In one embodiment, changes may be made to the model specific registers (MSRs) of a processor and new MSRs may be used to support configurable TDP for the processor. These registers may provide the ability to change the point where turbo engages, for example, and to set the runtime average power limiting (RAPL) power limit value for the new base frequency. In one embodiment, a list of registers that may be accessed, changed, or added using a configurable TDP, include:

PLATFORM_INFO: This register may be used to detect the configurable TDP capability, CONFIG_TDP_LIMIT_1; CONFIG_TDP_LIMIT_2: This register may be used to detect the configurable TDP ratios and corresponding TDP power and power range, CONFIG_TDP_CONTROL: This register may be used to allow software to select different TDP points and read current selection, PSTATE_NOTIFY Hook: This register may be used to allow software to enable turbo from a new P1 ratio point. Having this register separate from CONFIG_TDP_CONTROL may allow usage models where the OS might select a specific ceiling for allowable turbo range.

In other embodiments, other registers or storage (e.g., memory, cache, etc.), may be used in providing for a configurable TDP. Moreover, in some embodiments the functions provided in the above registers may be incorporated into a smaller number of registers or storage.

In some embodiments, there may not be unique platform physical requirements for configurable TDP. However, in some embodiments, specifications for power delivery and cooling may be developed to address requirements for each of the TDP points. Specifications may reflect the ability to select TDP levels for design and accommodate or not accommodate other points, in some embodiments.

In some embodiments, new interfaces or technologies may not be specifically required to support a configurable TDP. However, in some embodiments, affected design characteristics that may be addressed in specifications and enabling include thermal design current (ITDC) and the maximum possible current that may be supported (e.g., "Iccmax"). In some embodiments, parameters may be defined for each TDP point.

TDP may imply an indefinitely sustained cooling level be present to support the corresponding TDP power level. However, in one embodiment, no specific technique is required to represent the changes in cooling capabilities, whether exotic design, docked cooling, changes in fan speed, changes in ambient environment, etc. Cooling design requirements may be established for each TDP level in enabling documentation, however.

In one embodiment, configurable TDP for other logic, such as graphics, memory control, or peripheral control may used. For example, if configurable TDP is used for graphics, a graphics driver may need to be notified about the new TDP level and corresponding RP1 frequency. This can be done in at least two ways, in one embodiment:

(1) Via an interrupt to the graphics device driver from the processor when the TDP level and the corresponding RP1 frequency changes. This may require interrupt configuration and status registers in addition to the registers already needed to support configurable TDP, in one embodiment.

(2) Via the software stack notifying the graphics driver when the TDP level and the corresponding RP1 frequency changes. This may require updates to the software-to-graphics driver communication interface already in place as part of software stack.

In one embodiment, changing the TDP configuration may require the platform to restrict the OS from utilizing certain P-states (e.g., ACPI Notification), exposing all possible P-states to the OS at initialization and by enabling turbo capability at various operating points. The ACPI P-state table (PSS) may be populated appropriately, in some embodiments. In one embodiment, there may not be ecosystem requirements for supporting configurable TDP.

In one embodiment, configurable TDP is either statically configured to a value other than the fused defaults by the BIOS during initialization, for example, or by either the BIOS or a software driver dynamically during run-time. In one embodiment, a configuring the TDP is accomplished by writing a new turbo ratio limit to an MSR to set the point where turbo engages and writing a corresponding power limit to the RAPL power limit MSR in accordance with the value specified for the part/base frequency. Additionally, in some embodiments, the operating system may be notified to limit its use of P-states in accordance with the new base frequency. This may be accomplished, in one embodiment, by causing the OS to evaluate the ACPI_PPC object (Performance Present Capabilities) under each logical processor.

Figure 2:
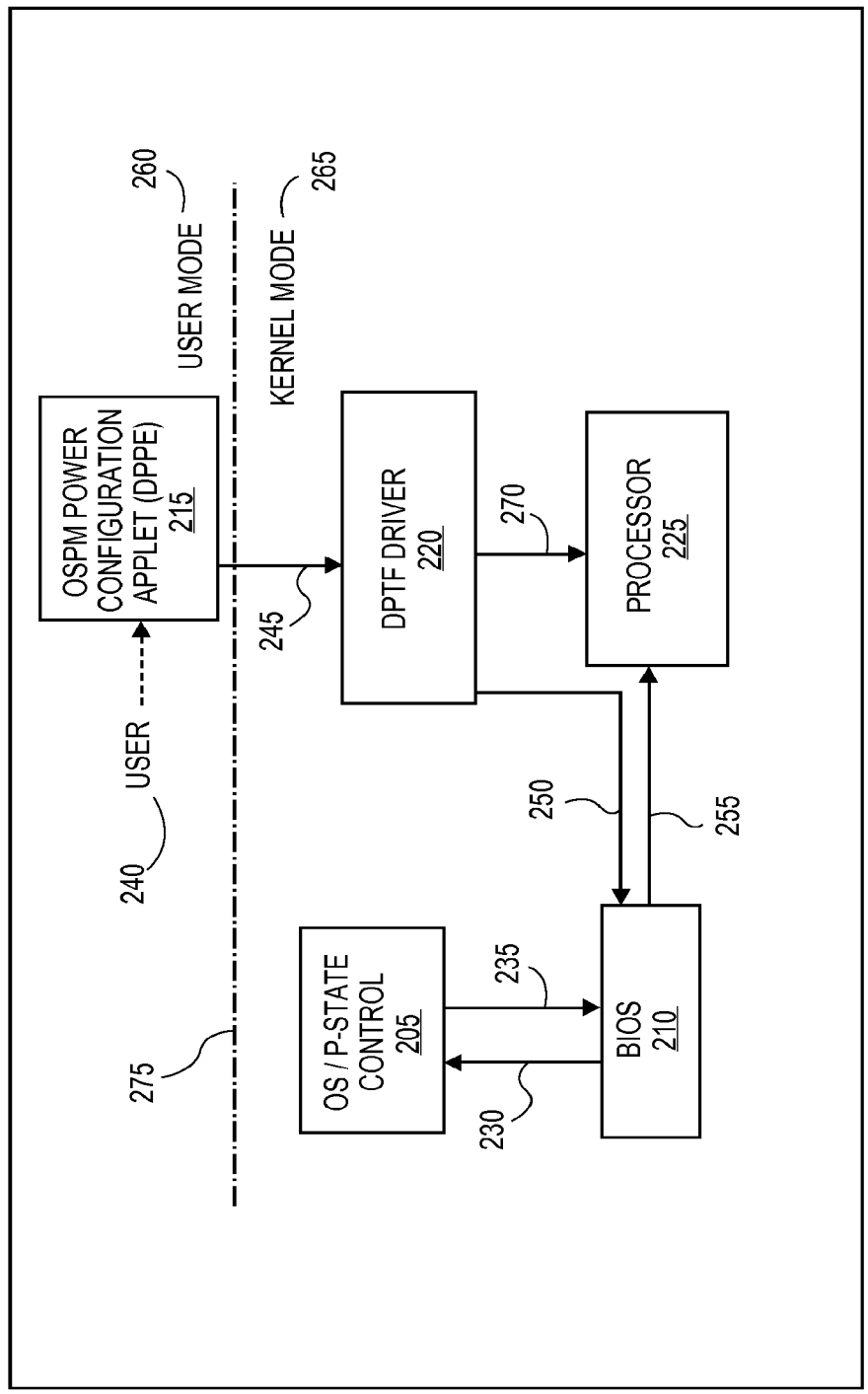
FIG. 2 illustrates aspects of at least one technique to configure TDP according to one embodiment.

FIG. 2 illustrates logic for configuring TDP, according to one embodiment. The logic illustrated in FIG. 2 may be included in processor hardware or some other hardware. Alternatively, the logic of FIG. 2 may be incorporated into a tangible, machine-readable medium having stored therein instructions, which if executed, causes the function of the logic illustrated in FIG. 2 to be performed. In FIG. 2, the OSPM power configuration applet 215 may be optional and its use of DPPE serves as a trigger 245 to invoke a TDP configuration change. Upon a trigger 245, for example a power source or power plan change, the applet communicates the change to the DPTF driver 220.

The DPTF driver 220 receives a TDP configuration change from the OSPM power configuration applet and performs two functions as a result. The first is to evaluate an ACPI object within its device scope that causes an ACPI notification to be issued by the BIOS 210 on logical processor 225 to the OS to inform it to re-evaluate the PPC object under each logical processor. The return value from the object is derived from a value passed in by the DPTF driver 220 and limits the operating systems use of certain P-states to the new base frequency and below. After this is accomplished, the DPTF driver 220 writes the new TDP configuration 270 to the processor 225 (MSR writes) to set the new turbo ratio (point where turbo is invoked) for the processor and the corresponding RAPL Power Limit value for the new base frequency.

In one embodiment, the processor contains the MSRs described above. Writing MSR may convey information to the power control unit (PCU) on the P-state where turbo is invoked (turbo ratio) as well as the RAPL power limit value.

In one embodiment, the BIOS 210 contains ACPI firmware and natively executable code. The BIOS 210 may be responsible for detecting Configurable TDP 255 feature availability, in one embodiment, and setting up ACPI firmware structures (_PSS) appropriately. The BIOS 210 may statically configure a TDP that is less than the maximum for a product or product family during initialization. Alternatively, the BIOS 210 alone may dynamically set the TDP configuration through a combination of SMM execution and ACPI notifications, in one embodiment. DPTF may also be utilized for setting the TDP configuration dynamically but in either case, the BIOS 210 may contain ACPI firmware that is evaluated to signal the OS to re-evaluate the _PPC object under each logical processor. In one embodiment, the _PPC object evaluation determines which P-states are currently available for use by the OS—corresponding to the TDP configuration (including the P-state where turbo is invoked).

In one embodiment, the OS receives an ACPI notification 230 that causes it to re-evaluate the _PPC object under each logical processor. The value returned from _PPC object evaluation limits the operating systems P-state control 205 software from using certain P-states in accordance with the TDP configuration. When the TDP configuration changes, the highest performance P-state allowed by the _PPC object is configured to become a P-state that invokes turbo operation.

Figure 3:
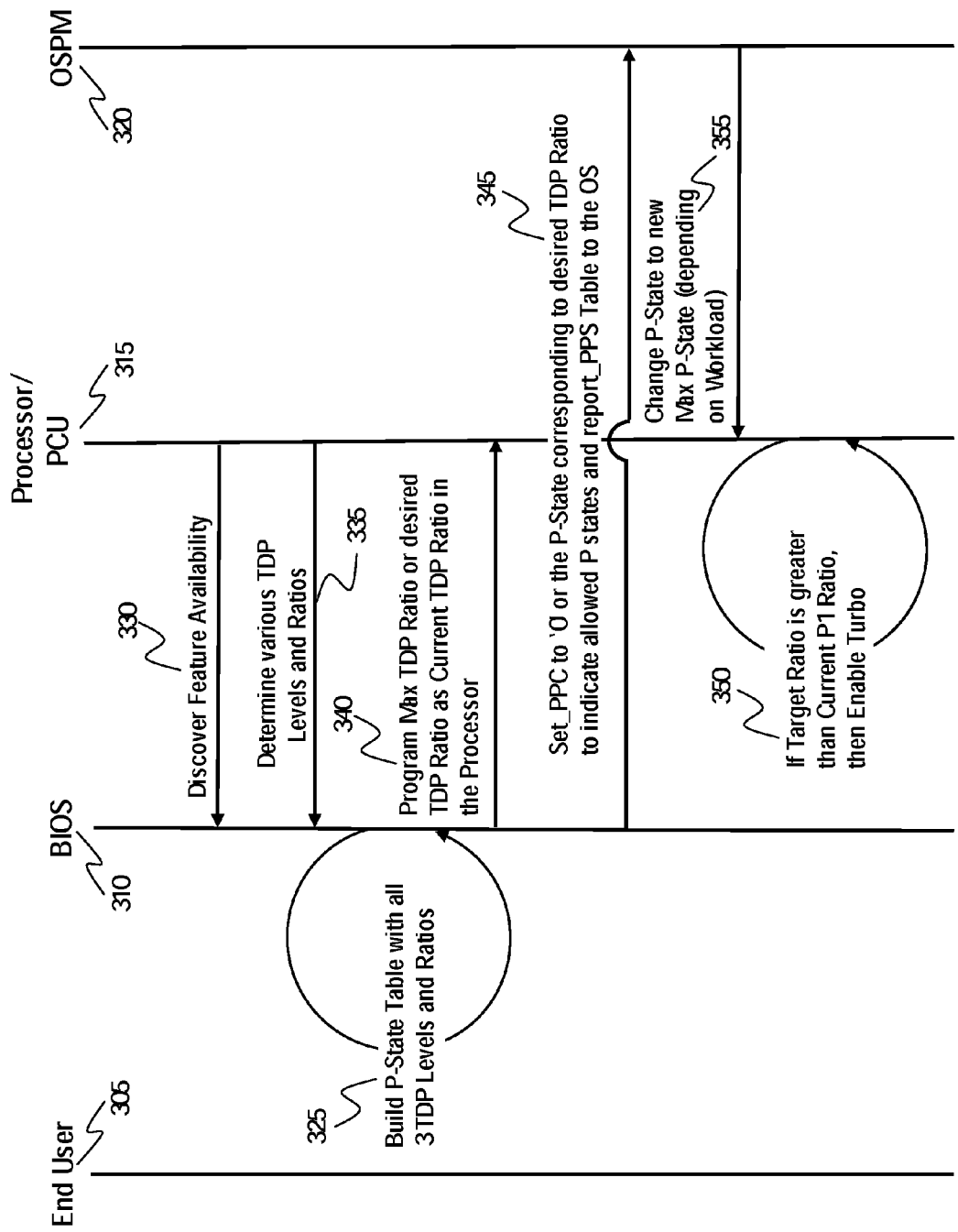
FIG. 3 illustrates aspects of an initialization technique corresponding to a configurable TDP according to one embodiment.

To initialize configurable TDP 255, Platform BIOS 210 may first detect the feature availability, according to one embodiment. Then it may build the OSPM_PSS table using the configurable TDP 255 information it gathers from the processor. FIG. 3 illustrates an initialization technique, according to one embodiment. For example, BIOS 310 may first detect the feature availability in process 330. Then BIOS 310 may build the OSPM_PSS table in process 325 using configurable TDP information such as TDP levels and ratios it gathers from processor/PCU 315 in process 335.

BIOS 310 may program a maximal TDP ratio or a desired TDP ratio as the current TDP ratio in processor/PCU 315 as illustrated in process 340. BIOS 310 may also set _PPC to zero "0" or the P-state corresponding to a desired TDP ratio to indicate the allowed P-states in process 345, and report _PSS table to OSPM 320. OSPM 320 may change the P-state for processor/PCU 315 to a new maximal P-state (depending on workload) in process 355. If the target rate is greater than the current P1 ratio, then processor/PCU 315 may enable turbo in process 350. The initialization technique of FIG. 3 and other processes or mechanisms herein disclosed are performed by processing logic that may comprise dedicated hardware or software or firmware operation codes executable by general purpose machines or by special purpose machines or by a combination of both.

Figure 4:
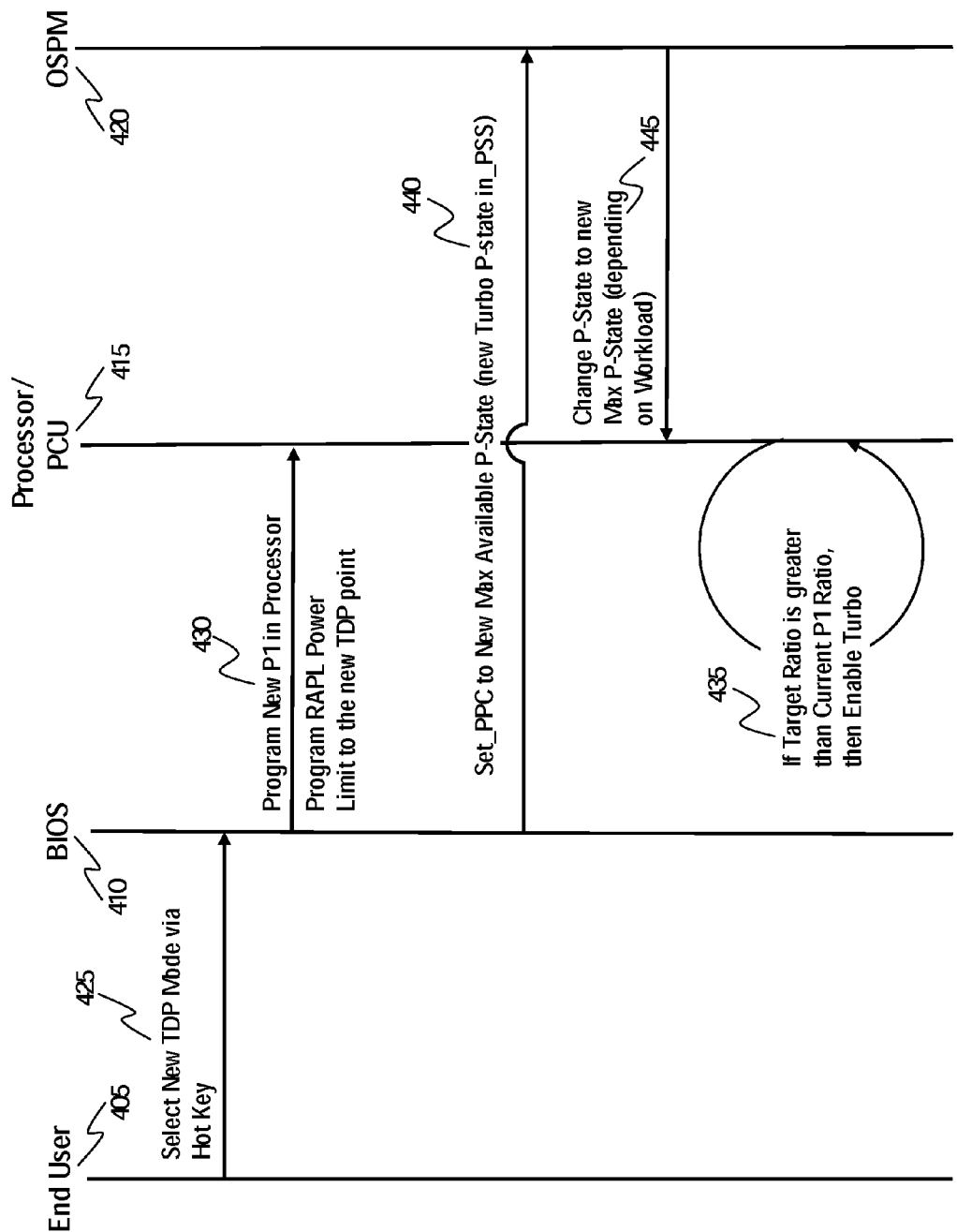
FIG. 4 illustrates aspects of at least one technique to configure TDP according to one embodiment.

In one embodiment, there are three possible mechanisms with which the TDP can be changed during run time. In other embodiments other techniques or mechanisms may be used to change TDP during run-time. In one embodiment, the platform may provide an option for the end user 405 to select specific modes of operation for the system and it could be provided as a hot key input 425. In this example, the hot key action by the user triggers the change of the TDP value during run time. FIG. 4 illustrates the flow of a user initiated TDP change, according to one embodiment. Following selection of a new TDP mode of operation for the system as a hot key input in process 425, BIOS 410 may program a new P1 ratio and program the RAPL power limit to the new TDP point in processor/PCU 415 as illustrated in process 430. BIOS 410 may also set _PPC to a new maximal available P-state (new turbo P-state in _PSS) in process 440, and report _PSS table to OSPM 420. OSPM 420 may then change the P-state for processor/PCU 415 to the new maximal P-state (depending on workload) in process 445. If the target rate is greater than the current P1 ratio, then processor/PCU 415 may enable turbo in process 435.

Figure 5:
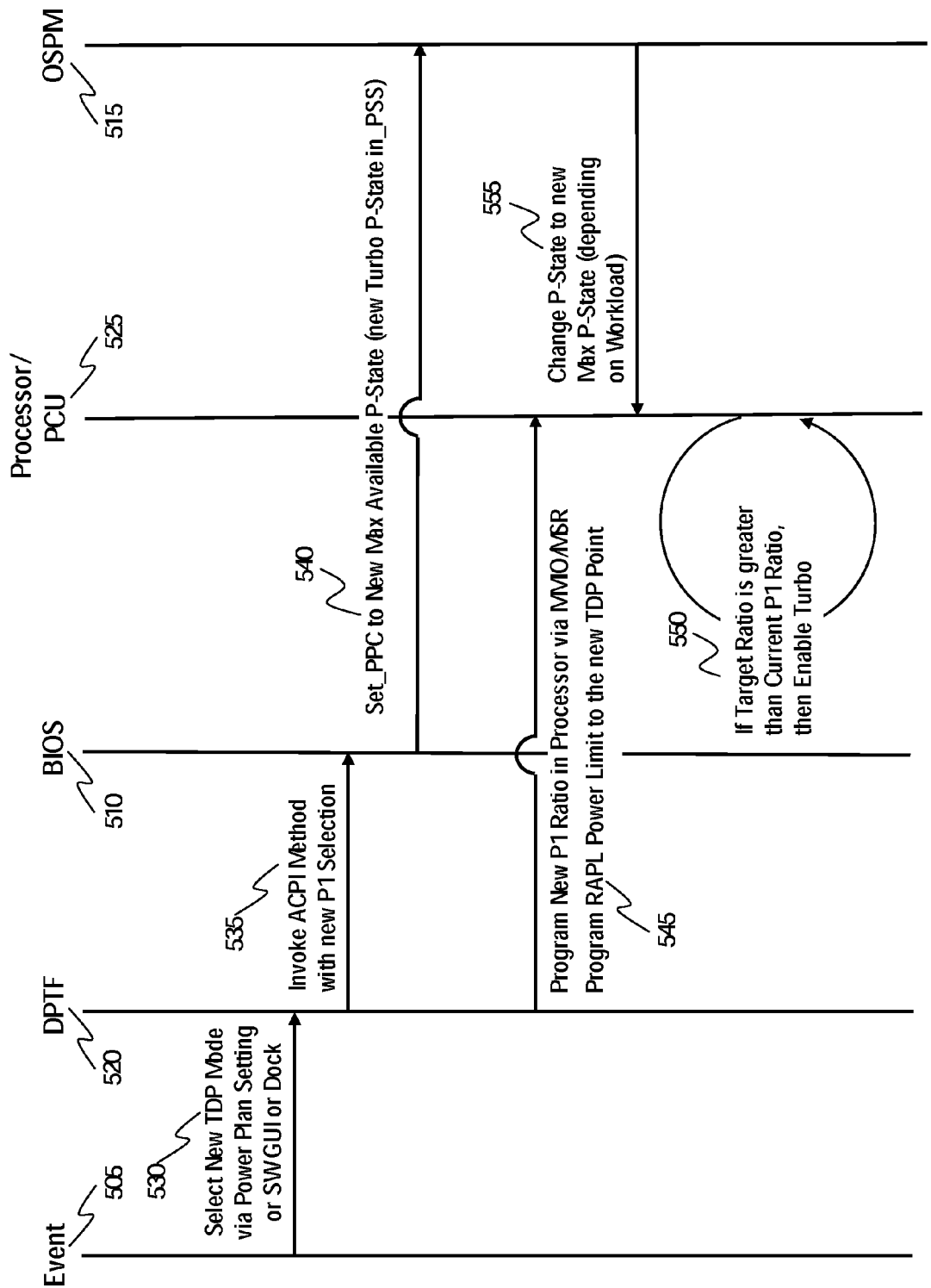
FIG. 5 illustrates aspects of at least one technique to configure TDP according to one embodiment.

A usage model, according to one embodiment, uses platform software to intercept user input and convert that to BIOS 510 calls to invoke the TDP change. FIG. 5 illustrates this usage model, according to one embodiment. In process 530, for example, event 505 may comprise a user selection of a new TDP mode via a power-pan setting or a software GUI or a dock, etc., and a change triggered by event 505 is communicated to DPTF driver 520. DPTF driver 520 invokes an ACPI method with a new P1 selection that causes an ACPI notification to be issued by the BIOS 510 in process 540 to OSPM 515 to inform it to set the _PPC object to a new maximal available P-state (new turbo P-state in _PSS). OSPM 515 may then change the P-state for processor/PCU 515 to the new maximal P-state (depending on workload) in process 555. The return value from the ACPI object is derived from a value passed in by the DPTF driver 520.

In one embodiment, processor/PCU 525 contains MSRs as described above. Writing an MSR may convey information to processor/PCU 525 on the P-state where turbo is invoked (turbo ratio) as well as the RAPL power limit value. So in process 545, DPTF driver 520 programs the new P1 ratio in processor/PCU 525 (via MMIO/MSR writes) to set the new turbo ratio (point where turbo is invoked) for processor/PCU 525, and programs the corresponding RAPL Power Limit value for the new TDP base frequency point. If the target rate is greater than the current P1 ratio, then processor/PCU 525 may enable turbo in process 550.

Figure 6:
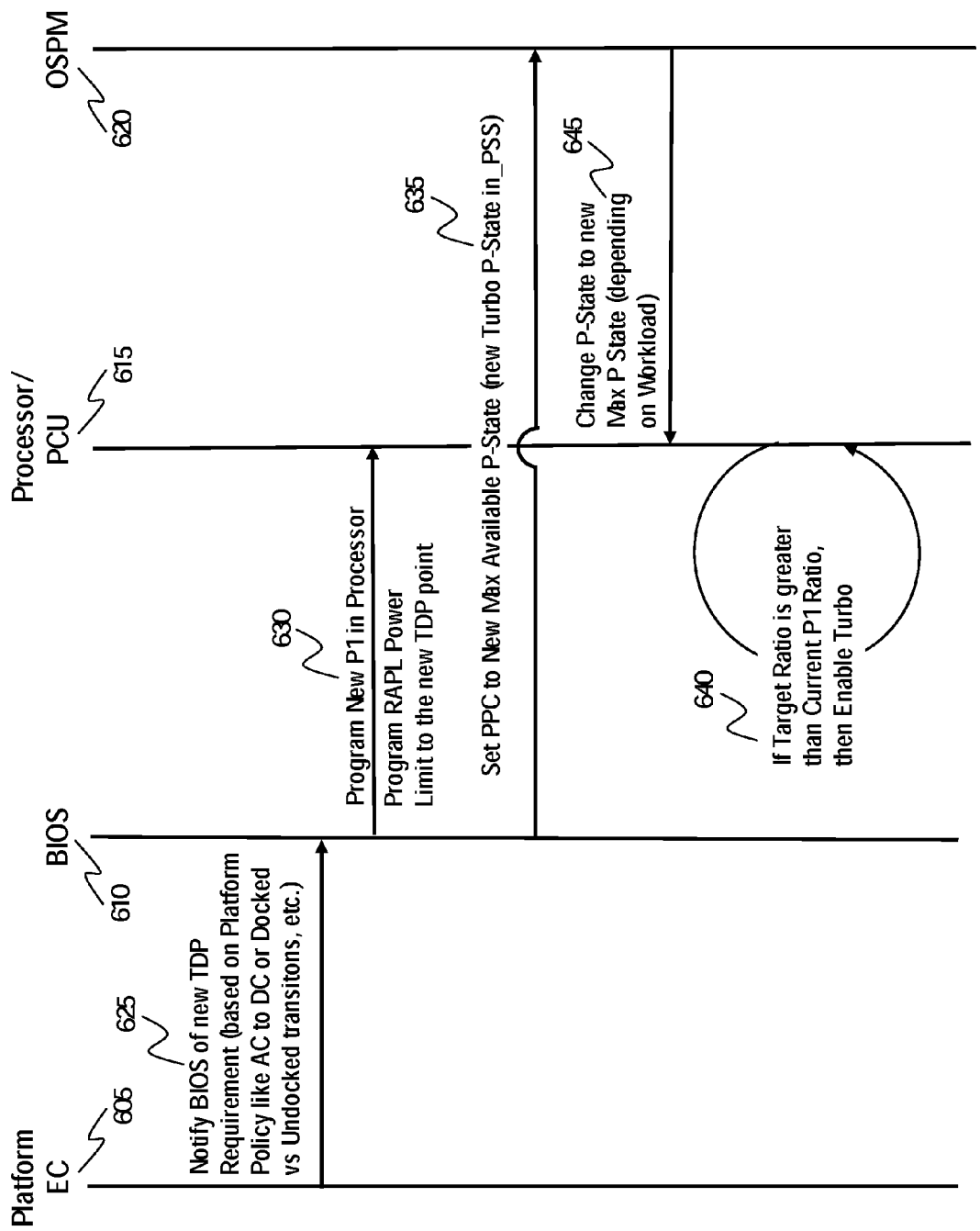
FIG. 6 illustrates aspects of at least one technique to configure TDP according to one embodiment.

In some embodiments, the platform may choose to not provide a user control to modify the TDP, but, base the decision on system events like AC to DC switch, or docked vs. undocked event, etc. This usage model is depicted in the sequence shown in FIG. 6, according to one embodiment. In process 625, for example, platform EC 605 notifies BIOS 610 of a new TDP requirement according to a system event as described above. BIOS 610 may program a new P1 ratio and program the RAPL power limit to the new TDP point in processor/PCU 615 as illustrated in process 630. BIOS 610 may also set _PPC to a new maximal available P-state (new turbo P-state in _PSS) in process 635, and report _PSS table to OSPM 620. OSPM 620 may then change the P-state for processor/PCU 615 to the new maximal P-state (depending on workload) in process 645. If the target rate is greater than the current P1 ratio, then processor/PCU 615 may enable turbo in process 640.

In one embodiment, the TDP configuration can be changed dynamically as described above.

In one embodiment, configurable TDP may interoperate with platform firmware and thermal control capability that manipulates ACPI objects to ensure that collisions do not occur. In one embodiment, runtime average power limiting (RAPL) allows a platform to limit the power consumption of the processor. Because platform may use the TDP details as a basis for RAPL limits, the fact that the TDP dynamically changes might result in the RAPL limit becoming invalid. For example, consider a case where the current TDP is 15 W and the RAPL limit has been set to 14 W by the platform. When the current TDP changes to 23 W, the RAPL limit of 14 W is too restricting and the processor will not be able to maintain the RAPL limit. In order to solve this issue, the RAPL limit may be updated as part of the configurable TDP change during run time to match with the new TDP level, according to one embodiment.

In one embodiment, configurable TDP maps to two platform features (grouping of interfaces specification)). These are TDP configurability interface (Configuration) and Trigger.

Feature Name: ConfigTDP
Platform Feature (PFAS) ConfigTDP
ConfigTDP.Trigger
ConfigTDP.Trigger.app
ConfigTDP.Trigger.driver (DPTF)
ConfigTDP.Trigger.bios
ConfigTDP.Configuration (Interface)
ConfigTDP.Configuration.bios
ConfigTDP.Configuration.driver (DPTF)
ConfigTDP.Configuration.cpu
ConfigTDP.Configuration.GFXDriver Some additional features, according to one embodiment, include new or new uses of processor MSRs and graphics driver changes.

Figure 7:
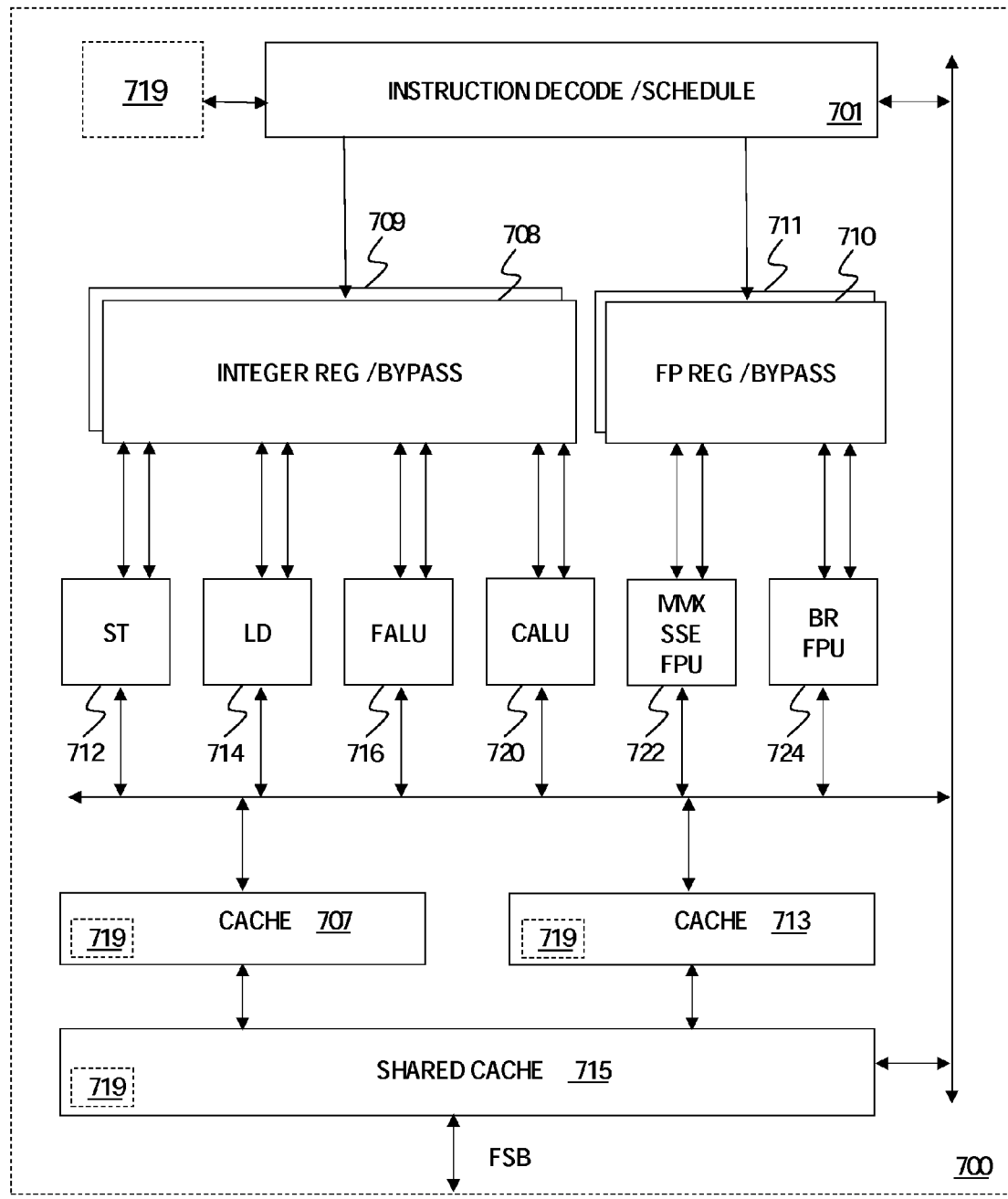
FIG. 7 illustrates a block diagram of a microprocessor, in which at least one embodiment of the invention may be used.

FIG. 7 illustrates a microprocessor in which at least one embodiment of the invention may be used. In particular, FIG. 7 illustrates microprocessor 700 having one or more processor cores 705 and 710, each having associated therewith a local cache 707 and 713, respectively. Also illustrated in FIG. 7 is a shared cache memory 715 which may store versions of at least some of the information stored in each of the local caches 707 and 713. In some embodiments, microprocessor 700 may also include other logic not shown in FIG. 7, such as an integrated memory controller, integrated graphics controller, as well as other logic to perform other functions within a computer system, such as I/O control. In one embodiment, each microprocessor in a multi-processor system or each processor core in a multi-core processor may include or otherwise be associated with logic 719 to enable flexible configuration of the TDP specification techniques, in accordance with at least one embodiment. The logic may include circuits, software (embodied in a tangible medium) or both to enable more efficient resource allocation among a plurality of cores or processors than in some prior art implementations.

Figure 8:
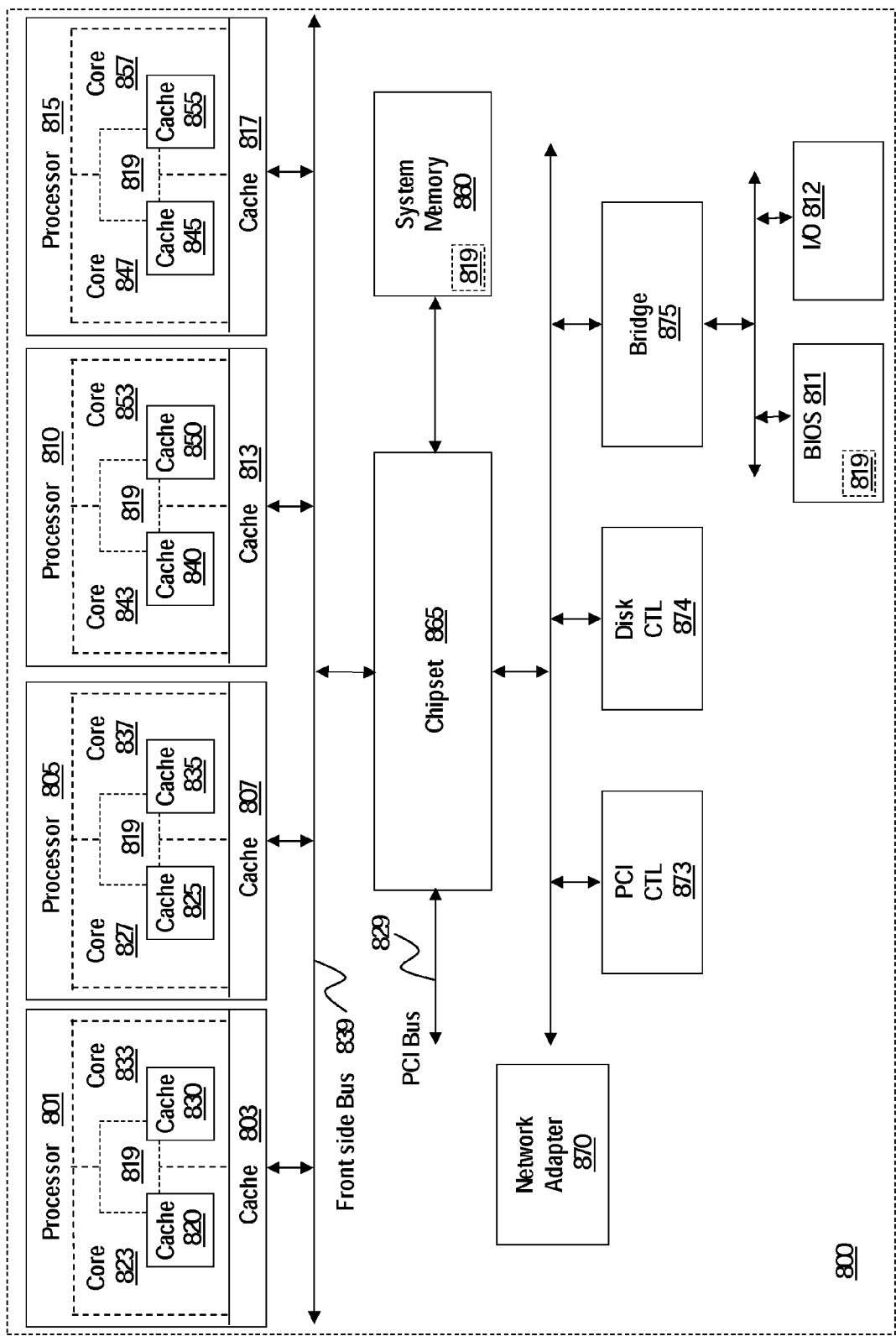
FIG. 8 illustrates a block diagram of a shared bus computer system, in which at least one embodiment of the invention may be used.

FIG. 8, for example, illustrates a front-side-bus (FSB) computer system in which one embodiment of the invention may be used. Any processor 801, 805, 810, or 815 may access information from any local level one (L1) cache memory 820, 825, 830, 835, 840, 845, 850, 855 within or otherwise associated with one of the processor cores 823, 827, 833, 837, 843, 847, 853, 857. Furthermore, any processor 801, 805, 810, or 815 may access information from any one of the shared level two (L2) caches 803, 807, 813, 817 or from system memory 860 via chipset 865. One or more of the processors in FIG. 8 may include or otherwise be associated with logic 819 to enable flexible configuration of the TDP specification techniques, in accordance with at least one embodiment.

In addition to the FSB computer system illustrated in FIG. 8, other system configurations may be used in conjunction with various embodiments of the invention, including point-to-point (P2P) interconnect systems and ring interconnect systems. The P2P system of FIG. 9, for example, may include several processors, of which only two, processors 970, 980 are shown by example. Processors 970, 980 may each include a local memory controller hub (MCH) 972, 982 to connect with memory 92, 94. Processors 970, 980 may exchange data via a point-to-point (PtP) interface 950 using PtP interface circuits 978, 988. Processors 970, 980 may each exchange data with a chipset 990 via individual PtP interfaces 952, 954 using point to point interface circuits 976, 994, 986, 998. Chipset 990 may also exchange data with a high-performance graphics circuit 938 via a high-performance graphics interface 939. Embodiments of the invention may be located within any processor having any number of processing cores, or within each of the PtP bus agents of FIG. 9. In one embodiment, any processor core may include or otherwise be associated with a local cache memory (not shown). Furthermore, a shared cache (not shown) may be included in either processor outside of both processors, yet connected with the processors via p2p interconnect, such that either or both processors' local cache information may be stored in the shared cache if a processor is placed into a low power mode. One or more of the processors or cores in FIG. 9 may include or otherwise be associated with logic 919 to enable flexible configuration of the TDP specification techniques, in accordance with at least one embodiment.

One or more aspects of at least one embodiment may be implemented by representative data stored on a machine-readable medium which represents or is coupled with various functionally descriptive matter and/or logic within the processor, which when read by a machine causes the machine to fabricate logic to perform the techniques described herein. Such representations, known as "IP cores" may be stored on a tangible, machine readable medium ("tape") and supplied to various customers or manufacturing facilities to load into the fabrication machines that actually make the logic or processor.

Embodiments of the invention may be included in or applied to any hardware device or portion thereof, including central processing units, graphics processing units, or other processing logic or cores within a processor or in a computer system. Embodiments may also be embodied in a tangible machine readable medium having stored there on a set of instructions which if performed by a machine causes the machine to perform operations described herein.

Thus, a method and apparatus for directing micro-architectural memory region accesses has been described. It is to be understood that the above description is intended to be illustrative and not restrictive. Many other embodiments will be apparent to those of skill in the art upon reading and understanding the above description. The scope of the invention may, therefore, be determined with reference to the appended claims, along with the full scope of equivalents to which such claims are entitled.

What is claimed is:

1. A processor comprising:
    one or more new model specific registers (MSRs) which support a configurable thermal design power (TDP) to be specified for the processor;
    logic to change a configurable TDP value, including updating a runtime average power limit (RAPL) value as part of the configurable TDP change, in response to a platform facilitated user control trigger, wherein the logic uses platform software to intercept the user control trigger and convert it to a basic input/output software (BIOS) call to cause the configurable TDP change and the platform is to facilitate an Advanced Configuration and Power Interface (ACPI) notification to an operating system to evaluate a Performance Present Capabilities (PPC) object.

2. The processor of claim 1, wherein the logic is to change the configurable TDP value in response to a power supply change from alternating current (AC) to direct current (DC) or vice versa.

3. The processor of claim 1, wherein the logic is to change the configurable TDP value, including a turbo ratio value, in response to a docking event.

4. The processor of claim 1, wherein the configurable TDP value is to change from an initially configured TDP value in response to the user control trigger.

5. The processor of claim 1, wherein the configurable TDP value is to be changed in response to storing information in at least one model specific register (MSR).

6. The processor of claim 1, wherein changing the configurable TDP value causes a corresponding change in a turbo mode target frequency.

7. The processor of claim 1, wherein the configurable TDP value is to change in response to a change in ambient temperature.

8. A system comprising:
    a processor comprising:
        a plurality of logical processors, and
        one or more model specific registers (MSRs) which support a configurable thermal design power (TDP) to be specified for the processor;
    logic to change a configurable TDP value, including updating a runtime average power limit (RAPL) value as part of the configurable TDP change, in response to user control, wherein the logic uses platform software to intercept the user control and convert it to a basic input/output software (BIOS) call to cause the configurable TDP change, which causes a platform facilitated notification to be issued to an operating system to evaluate a Performance Present Capabilities (PPC) object under each of the plurality of logical processors; and
    memory to store instructions to be performed by the processor.

9. The system of claim 8, wherein the logic is to change the configurable TDP value in response to a power supply change from alternating current (AC) to direct current (DC) or vice versa.

10. The system of claim 8, wherein the logic is to change the configurable TDP value, including a turbo ratio value, in response to a docking event.

11. The system of claim 8, wherein the configurable TDP value is to change from an initially configured TDP value in response to the user control.

12. The system of claim 8, wherein the configurable TDP value is to be changed in response to storing information in at least one model specific register (MSR).

13. The system of claim 8, wherein changing the configurable TDP value causes a corresponding change in a turbo mode target frequency.

14. The system of claim 8, wherein the configurable TDP value is to change in response to a change in ambient temperature, thermal, acoustic, or system environmental condition.

15. A method comprising:
    changing, via one or more model specific registers (MSRs) for a processor, a configurable processor thermal design power (TDP) value, including updating a runtime average power limit (RAPL) value as part of the configurable TDP change, in response to user control;
    using platform software to intercept the user control and convert it to a basic input/output software (BIOS) call to cause the configurable TDP change; and
    causing an operating system, as part of the configurable TDP change, to evaluate an Advanced Configuration and Power Interface (ACPI) Performance Present Capabilities (PPC) object under each of a plurality of logical processors.

16. The method of claim 15, further comprising changing the configurable TDP value in response to a power supply change from alternating current (AC) to direct current (DC) or vice versa.

17. The method of claim 15, further comprising changing the configurable TDP value, including a turbo ratio value, in response to a docking event.

18. The method of claim 15, wherein the configurable TDP value is to change from an initially configured TDP value in response to the user control.

19. The method of claim 15, wherein the configurable TDP value is to be changed in response to storing information in at least one model specific register (MSR).

20. The method of claim 15, wherein changing the configurable TDP value causes a corresponding change in a turbo mode target frequency.

21. The method of claim 15, wherein the configurable TDP value is to change in response to a change in ambient temperature.

* * * * *